UNITED STATES PATENT OFFICE.

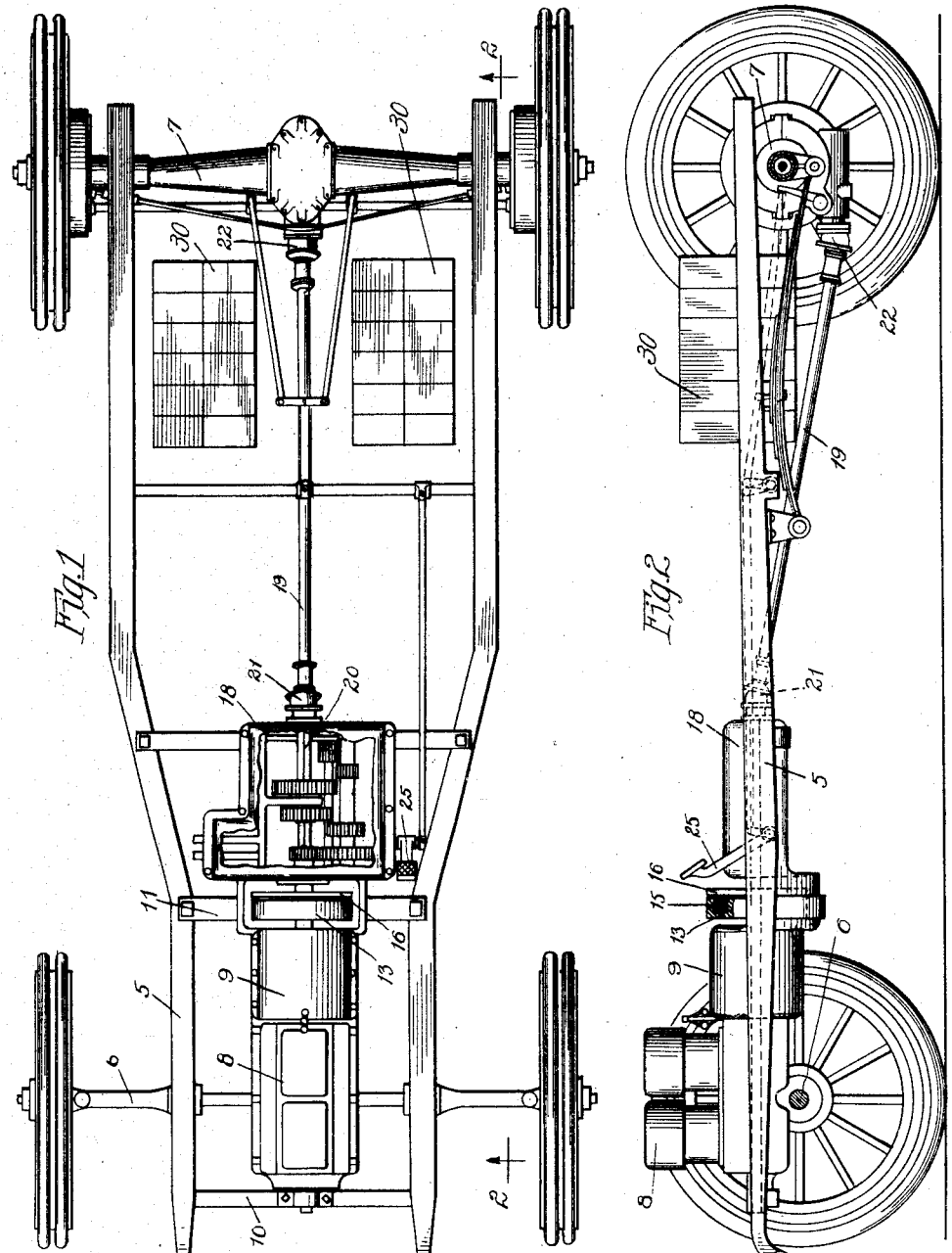

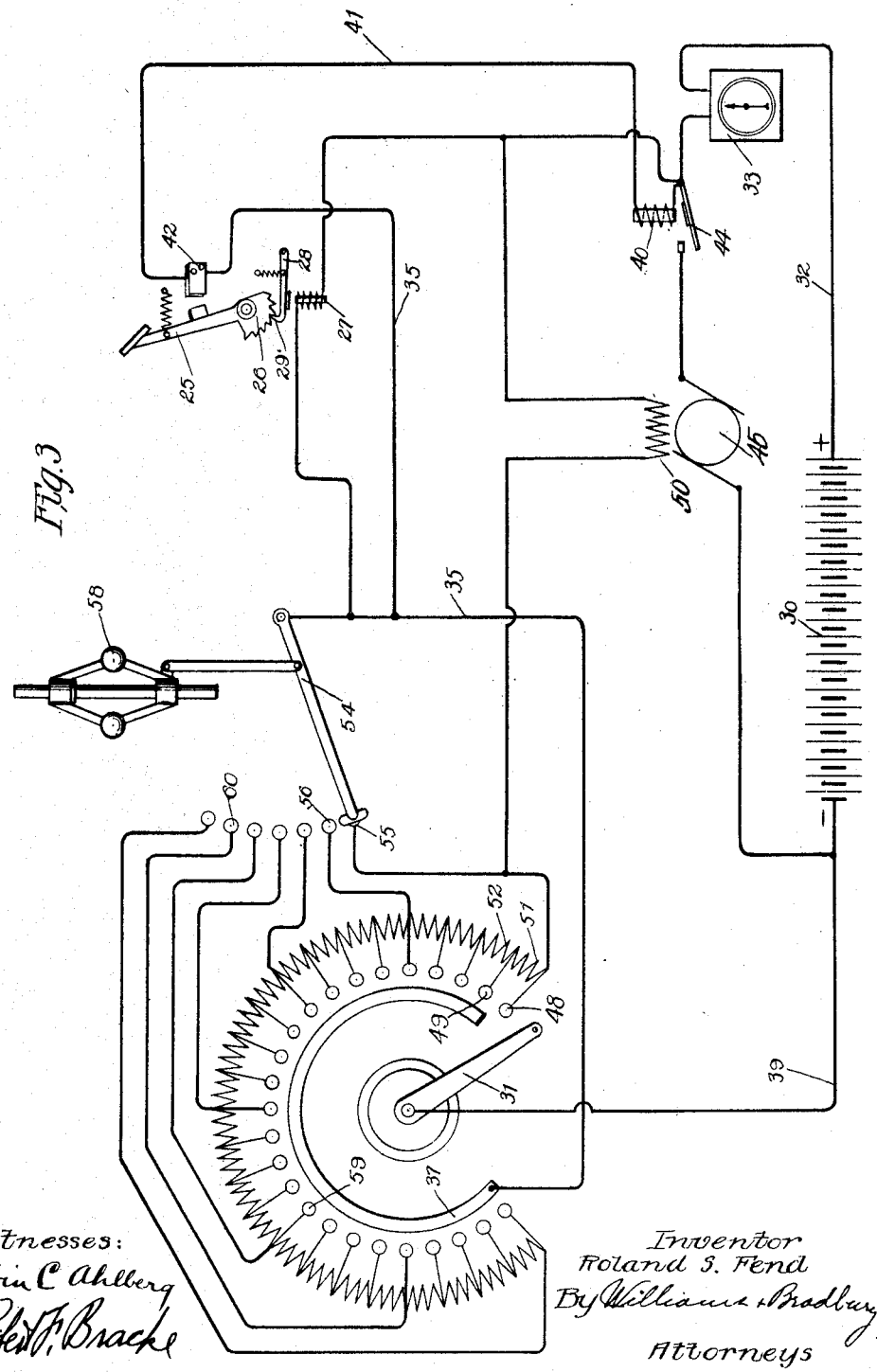

ROLAND S. FEND, OF CHICAGO, ILLINOIS, ASSIGNOR TO WOODS MOTOR VEHICLE COMPANY, OF CHICAGO, ILLINOIS, A CORPORATION OF ILLINOIS.

AUTOMOBILE.

1,204,146.  Specification of Letters Patent.  Patented Nov. 7, 1916.

Application filed June 26, 1915. Serial No. 36,592.

*To all whom it may concern:*

Be it known that I, ROLAND S. FEND, a citizen of the United States, residing at Chicago, in the county of Cook and State of Illinois, have invented certain new and useful Improvements in Automobiles, of which the following is a full, clear, concise, and exact description, reference being had to the accompanying drawings, forming a part of this specification.

My invention relates to combined electric and gasolene motor driven vehicles in which either the motor or the engine may be used alone for the motive power, or in which the two may act simultaneously to drive the vehicle.

Gasolene engine driven vehicles of the present day have reached a high degree of perfection but the control of such vehicles is still not as simple as is desired. The desire for rapid acceleration has made necessary the carriage of a large engine, the available power of which is considerably in excess of the power required for driving the vehicle at ordinary speeds without acceleration.

Vehicles of the class driven solely by electric motors are at the present day provided with storage batteries which are of great weight and require a correspondingly heavy and substantial chassis construction. These vehicles are extremely simple in operation and have been almost universally provided with series motors which by reason of their high starting torque have made the use of speed gears unnecessary. These vehicles have certain inherent disadvantages, however, the principal one of which is the rapid deterioration of the storage battery when operated under the conditions which this type of vehicle requires; that is, frequent over-charge and overdischarge, and another and by no means inconsiderable shortcoming is that the touring distance of these vehicles upon a single battery charge is so small as to make them practically useless for country driving. The controllers for series motors are usually complicated mechanical switching devices so constructed to interrupt and switch the large armature current.

Having had wide experience with both types of vehicles and, therefore, being in full knowledge of the advantages and disadvantages of each of the foregoing classes, I have conceived and produced a vehicle combining the principal advantageous features of each type and from which I have endeavored to eliminate those features of disadvantage which I have observed in each of the types of vehicles above mentioned.

In carrying out my invention I provide an electric motor or dynamo of the shunt field type, the size of which is somewhat less than that ordinarily used for electric vehicles of equal size as the one herein illustrated, and provide between this motor and the driving axle electromagnetic clutch and gear shift mechanisms which permit my dynamo to be operated at a comparatively high speed, while the automobile is being started or propelled at low speed. That is, my dynamo being shunt wound operates efficiently only within a comparatively small speed range, thus making the variable ratio gears advantageous.

The gasolene engine which I provide in direct and permanent connection with the electric dynamo is of less capacity than is ordinarily provided for gasolene automobiles of the size of the one herein illustrated, but is capable of producing a maximum horse-power somewhat greater than the maximum horse-power of the electric dynamo. The engine and motor combined are capable of producing a maximum horse-power equal to that of the gasolene engine ordinarily provided for vehicles of the size and speed capacity of the one herein illustrated.

For the operation and control of my automobile I preferably provide automatic spark advance so that a single lever controlling the gasolene throttle is all that is necessary for the control of the gasolene engine.

The circuit by means of which the electric dynamo is controlled is provided with a centrifugally controlled governing device which cuts resistance into and out of the shunt field circuit dependent upon the speed of the vehicle so as to give the purely shunt field dynamo somewhat the characteristics which are inherent in a series wound dynamo. The speed and performance of the dynamo itself is controlled by a single lever which cuts in and out of the shunt field circuit series resistances to primarily control the speed of the vehicle, the action of the centrifugal governor and the contacts controlled thereby being such that the operator will be unable to reduce the field excitation more rapidly than is warranted by the speed of the motor shaft, thus preventing a large drain upon the battery.

Other features and advantages of my invention will be more clearly pointed out in the following detailed description and the appended claims.

My invention is illustrated in the accompanying drawings in which like parts are designated by similar characters throughout, and in which—

Figure 1 is a plan view of the chassis. Fig. 2 is an elevation partly in section; and Fig. 3 is a diagrammatic circuit drawing illustrating the means of controlling the dynamo motor.

I have shown my invention applied to the chassis of an automobile which has a general appearance more nearly corresponding to that of the present electric vehicles than of the present gasolene vehicles, but it is to be understood that the invention is applicable to any desired construction of car body and chassis.

The chassis proper comprises a main frame 5 mounted upon a front axle 6 and rear axle housing 7, the latter inclosing the usual two part rear axle and differential, not herein illustrated. At the forward end of the chassis, and supported thereon by the well-known three point suspension, are the gasolene engine 8 and dynamo 9 united together to form a unit structure which is supported upon the transverse members 10 and 11. The gasolene engine herein illustrated is of the four cylinder type, two cylinders being cast *en bloc*, though any type of engine suitable for driving ordinary gasolene automobiles would be correspondingly suitable for use with my invention. The electric dynamo 9 is of somewhat smaller maximum power output than the gasolene engine, but is, nevertheless, of sufficient size to drive the vehicle at a fairly high speed and to accelerate the vehicle during starting.

I preferably unite the crank shaft of the engine directly with the armature shaft of the motor so that this armature and clutch portion 13 serve as the fly wheel for the engine, thus eliminating the necessity of the usual fly wheel. The clutch 13 is preferably of the magnetic type, since this vehicle is provided with a storage battery 14 capable of supplying current sufficient for the satisfactory operation of an electro-magnetic clutch. The clutch 13 may be of any of the well-known magnetic clutch structures and is here illustrated as provided with an annular coil 15 for magnetizing the inclosing shell which rotates with the engine and motor and with the disk 16 acting as an armature, and adapted to be drawn into frictionable relation with a member 15 by the magnetization of the latter.

As will be more clearly pointed out in connection with the detailed description of the electric dynamo circuit and the controlling means therefor, I desire to operate my electric vehicle with a purely shunt dynamo rather than with a series or compound dynamo, as ordinarily used for motor vehicles. The principal advantage in this arrangement is the simplification of controlling mechanism, it being possible with this arrangement to satisfactorily control the dynamo speed without the necessity of switching large currents such as traverse the armature of the electric dynamo. Furthermore, shunt dynamos have the characteristic of automatically converting themselves into generators when the speed is increased above the point at which the counter electromotive force of the armature equals that of the storage battery. Since purely shunt wound dynamos cannot be economically designed so as to give a high torque at very low speeds or, in other words, since it requires too much field winding space to magnetize the dynamo field sufficiently by means of a shunt winding that the dynamo will run at low speeds without drawing excessive currents from the storage battery, I have found it desirable to place a gear shift mechanism between the electric dynamo and the propeller shaft by means of which the vehicle may be started or driven at low speeds, while the dynamo is operating at a comparatively high speed and, therefore, at a greater efficiency than that at which it can be operated at a lower speed. The gear shift housing 18, for the purpose above mentioned, contains any suitable arrangement of gears, the ones herein illustrated being of a well-known class, it being understood that they perform the usual function of changing the speed relation between the driving and driven shafts, and that in one position the two shafts are connected together without the interposition of any gear mechanism and in another position they reverse the direction of operation of the propeller shaft. The propeller shaft 19 is preferably connected with a shaft 20 where it protrudes from the casing of the gear shift mechanism by means of a universal joint 21, which may be of any well-known structure since it forms no part of the present invention. The shaft 19 is likewise connected with the portion of the propeller shaft inclosed within the rear housing by a second universal joint 22.

The brake pedal 25 is provided with a ratchet 26, shown more particularly in Fig. 3, which is controlled by an electro-magnet 27, the armature 28 of which carries a pawl 29 which fulfills the function of maintaining the brake pedal in its actuated or locking position until the electro-magnet 27 is energized.

The winding of electro-magnet 27, as shown in Fig. 3, is brought into circuit with the main battery 30 by the first movement of the rheostat arm 31, the circuit, therefore, including conductor 32, the ampere hour meter 33, conductor 34, coil of electro-magnet 27, conductor 35, segment 37, rheostat arm 31, and conductor 39 to the negative pole of battery 30. After the electro-magnet 27 is thus energized and the retaining pawl 28 withdrawn from the ratchet 26, the brake pedal 25 will move to its upright position either immediately or upon being released by the foot and when this occurs a circuit is completed from the positive pole of battery 30 through conductor 32, ampere hour meter 33, coil of relay 40, conductor 41, switch 42, conductor 35, segment 37, arm 31, and conductor 39 to the negative pole of the battery. Current in this path energizes relay 40, closing the switch 44 and completing a circuit through the armature 45 of the dynamo.

Ordinarily, in starting, an operator will gradually advance the lever 31 over the contacts 48, 49, etc., to gradually increase the speed of the vehicle, it being observed that when the lever 31 rests upon contact 49 the field strength will be at a maximum, there being at this time no external resistance in circuit with the shunt field coils 50. If the lever 31 is allowed to remain upon the contact 49 the speed of the car will gradually increase and the motor torque gradually diminish until a point of equilibrium has been reached, that is, until the diminished torque of the motor is incapable of propelling the vehicle at greater speed. By advancing the lever 31 resistance units 51, 52, etc., may be included in series with the shunt field coils, thus reducing the field magnetization and increasing the speed of the vehicle in a manner characteristic of shunt wound dynamos.

In order to prevent the rapid inclusion of too much resistance in the field circuit whereby too great a weakening of the dynamo field would be brought about while the dynamo was running at comparatively low speed and whereby the draft upon the battery would be very great, I have provided an automatically advancing arm 54 which passes over contacts 55, 56, etc., connected in multiple with certain spaced contacts of the rheostat, this arm 54 being controlled by a suitable governor 58 driven by the dynamo and serving by its automatic operation to prevent a too rapid decrease in the field current.

The adjustment of the governor 58 is such that when the lever 31 is set upon contact 49 and the vehicle is allowed to proceed with the lever in that position until it has accelerated to as great a speed as it will attain on level roads then the lever 54 will rest upon contact 56. Likewise, if the lever 31 is manually placed upon contact 59 of the rheostat and the vehicle is running on level roads the arm 54 will advance until it rests upon contact 60. It will thus be seen that lever 54 does not in any way interfere with the manual control of the vehicle unless the operator attempts to progress the lever 31 too rapidly, or unless in the operation of the car a hill or other impediment such as a bad road is encountered in which case the decrease in speed of the vehicle will automatically cut out a portion of the resistance from the field circuit through the automatic operation of the lever 54. The governor 58, therefore, and the switch contacts controlled by it act merely as a damper upon the operator automatically preventing him from drawing such excessive current from the battery as to be detrimental to it.

When during the operation of the vehicle the gasolene motor 8 is brought into service then as soon as sufficient speed has been attained that the voltage generated in the motor armature is greater than the impressed voltage of the battery a reversal of current will occur and the dynamo will thus act as a generator to recharge the storage battery. The speed at which the dynamo will be converted into a generator will depend entirely upon the field excitation. For example, if the vehicle is being driven by the gasolene motor at the rate of fifteen miles an hour the electric dynamo can be caused to operate as a generator to charge the battery at any desired rate depending upon the position of the rheostat arm 31. If this arm is placed upon the first contact 49 of the rheostat it is obvious that the rate at which the battery will be replenished will be much greater than if the arm 31 is placed upon the contact 59 of the rheostat.

If while the vehicle is being driven at, for example, twenty miles an hour by the gasolene engine, and the lever 31 is placed in such a position on the rheostat that the dynamo is substantially floating, that is, that it is neither running as a motor nor a generator but is creating the same voltage in its armature as the impressed voltage of the battery, a hill is encountered whereby the speed of the car is decreased the motor will immediately receive current from the storage battery and will automatically act in assistance to the gasolene engine to maintain the speed of the car at substantially that at which it was progressing before the hill was encountered. It will be understood, of course, that the governor 58 will under these circumstances be operated at such a speed that the lever 54 will not enter into the control of the field circuit. In other words, whenever the power of the gasolene engine is added to that of the electric dynamo unless a very steep hill is encountered the speed of the vehicle will be maintained sufficiently high that the lever 54 will always stand at a point in advance of the position of the lever 31.

It is sometimes desirable, even while driving the vehicle at a slow speed, to charge the storage battery at a high rate and by my invention this is accomplished by the aid of the change gears 18, by means of which both the engine and dynamo may be driven at any of three speeds for each speed of the vehicle. This arrangement permits the application of great driving power at low speeds when such is occasionally needed, and also eliminates the necessity of driving the engine in a reverse direction in backing the vehicle, the usual reversing gears being provided in the change gear housing.

Having thus described my invention, what I claim as new and desire to secure by United States Letters Patent is:

1. In a motor vehicle, the combination with a storage battery of a shunt wound electric dynamo for propelling the vehicle, a hand operated rheostat for including and excluding resistance in series with the shunt field of the dynamo, and means for preventing the inclusion of resistance in circuit with the field of said dynamo comprising an automatically operating contact device responsive to the speed of the dynamo.

2. In a motor vehicle, the combination with a storage battery of a dynamo, a shunt field for said dynamo, a plurality of resistance units and means for manually including said units in series with said shunt field, and centrifugally operated means responsive to the speed of the dynamo for preventing the manual inclusion of said resistance units in the field circuit unless the dynamo is being propelled at a speed satisfactory for the inclusion of such resistance units in said shunt field circuit.

3. In a motor vehicle, the combination with a storage battery of a dynamo for propelling the vehicle and charging said battery, a shunt field winding for said dynamo, a governor mechanically driven from the dynamo shaft and an external resistance comprising a plurality of sections, and means under the control of said governor for including said sections, one at a time, in series with the dynamo shunt field as the speed of the dynamo increases.

4. In a motor driven vehicle, the combination with a storage battery of a dynamo driven thereby for propelling the vehicle, an engine for propelling the dynamo for charging said storage battery, a hand operated rheostat for controlling the field magnetization of said dynamo, a mechanically operated device for preventing a too rapid decrease in the field magnetization of said dynamo, said mechanically operated device being so adjusted that under the normal operation of the motor vehicle it will not interfere with a further gradual decrease in the field magnetization of the dynamo through the operation of the manual device.

5. In a motor vehicle the combination with a storage battery of a dynamo driven thereby for propelling a vehicle, an internal combustion engine for propelling the dynamo for charging the storage battery and for assisting in driving the vehicle, a ratio changing mechanism between the dynamo and the driven axle of the vehicle whereby different speed ratios may be established between the dynamo and the driven axle, a hand operated rheostat for controlling the field magnetization of said dynamo, a governor depending upon the speed of the dynamo shaft and arranged to prevent the too rapid inclusion of resistance in the field circuit of the dynamo, said governor being so adjusted that under all of the different speed relations between the dynamo and the driven axle of the motor vehicle the governor will be effective only during acceleration of the vehicle.

In witness whereof, I hereunto subscribe my name this 18th day of June, A. D. 1915.

ROLAND S. FEND.

Witnesses:
 THOMAS CLEMENTS,
 W. B. KENNEDY.